United States Patent [19]

Tait et al.

[11] Patent Number: 4,771,027

[45] Date of Patent: Sep. 13, 1988

[54] CATALYST FOR THE HYDROTREATING OF NITROGEN-CONTAINING FEEDS

[75] Inventors: A. Martin Tait; Thomas D. Nevitt, both of Naperville, Ill.; Albert L. Hensley, Jr., Munster, Ind.

[73] Assignee: Amoco Corporation, Chicago, Ill.

[21] Appl. No.: 35,613

[22] Filed: Apr. 7, 1987

Related U.S. Application Data

[63] Continuation of Ser. No. 512,704, Jul. 11, 1983, abandoned, which is a continuation-in-part of Ser. No. 200,544, Oct. 24, 1980, abandoned, which is a continuation-in-part of Ser. No. 181,433, Aug. 4, 1980, Pat. No. 4,306,695, which is a continuation of Ser. No. 021,575, Mar. 19, 1979, Pat. No. 4,224,144.

[51] Int. Cl.$^4$ .......................... B01J 21/12; B01J 23/14
[52] U.S. Cl. ...................................... 502/257; 502/255
[58] Field of Search ................................. 502/257, 255

[56] References Cited

U.S. PATENT DOCUMENTS

| | | | |
|---|---|---|---|
| 4,008,149 | 2/1977 | Itoh et al. | 208/216 |
| 4,181,602 | 1/1980 | Quick et al. | 208/216 PP |
| 4,224,144 | 9/1980 | Hensley, Jr. et al. | 208/216 PP |

*Primary Examiner*—Carl F. Dees
*Attorney, Agent, or Firm*—Ekkehard Schoettle; William H. Magidson; Ralph C. Medhurst

[57] ABSTRACT

There are disclosed a catalyst and a process for the hydrodenitrogenation of a hydrocarbon stream containing a substantial amount of nitrogen compounds, such as whole shale oil.

The catalyst comprises a hydrogenation component comprising chromium, molybdenum, and at least one Group VIII metal deposed upon a porous alumina-silica support, the silica of said support being present in an amount within the range of about 10 wt % to about 50 wt %, based upon the weight of said support.

The process comprises contacting the hydrocarbon stream under hydrodenitrogenation conditions and in the presence of hydrogen with the aforesaid catalyst.

10 Claims, 1 Drawing Sheet

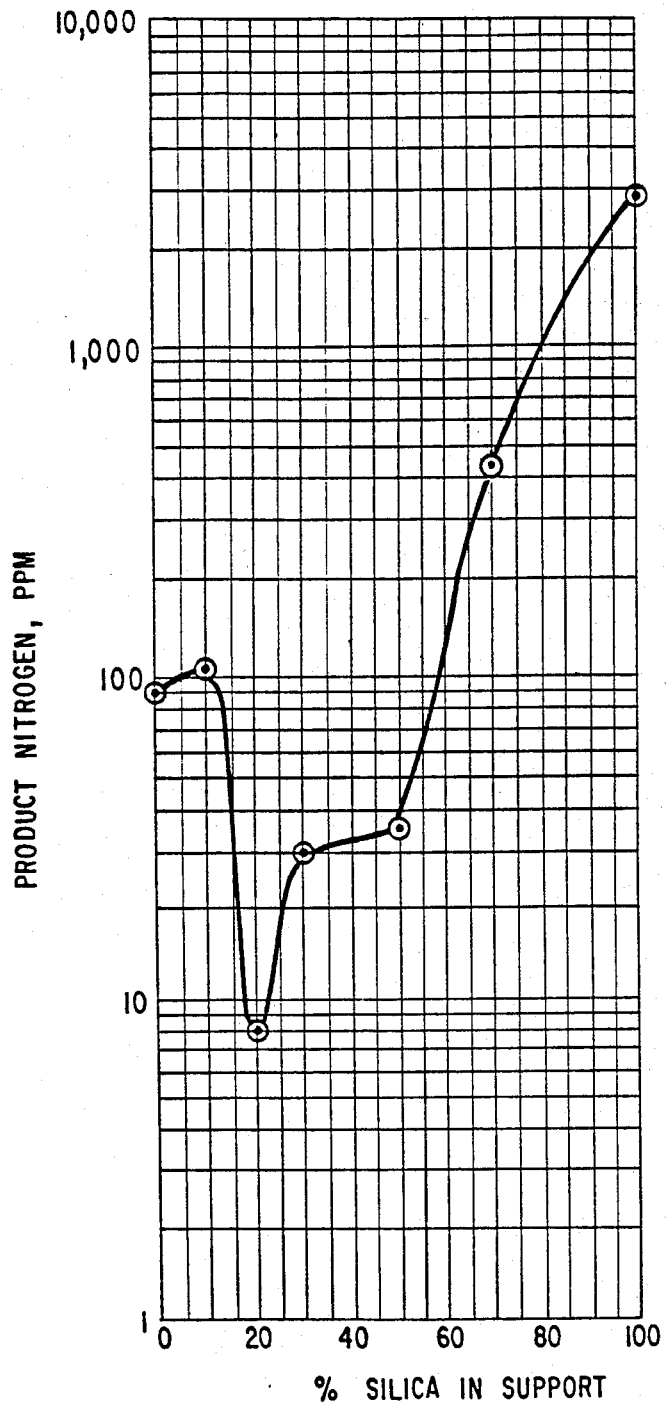

CATALYST FOR THE HYDROTREATING OF NITROGEN-CONTAINING FEEDS

CROSS REFERENCE TO RELATED APPLICATIONS

This application is a continuation of U.S. Ser. No. 512,704 filed on July 11, 1983 (now abandoned) which is a continuation-in-part application of U.S. Ser. No. 200,544 which was filed in U.S. Patent and Trademark Office on Oct. 24, 1980 (now abandoned).

The above-mentioned U.S. Ser. No. 200,544 was filed concurrently with U.S. Ser. No. 200,536, which discloses the hydrodenitrogenation and hydrocracking of high-nitrogen feeds in the presence of a catalyst comprising chromium, molybdenum, and at least one metal of Group VIII, a molecular sieve zeolite having a pore diameter of at least 5 Å (0.5 nm) and containing exchangeable cations, and a refractory inorganic oxide, such as an alumina, silica, or silica-alumina. Ser. No. 200,544 is a continuation-in-part of U.S. Ser. No. 181,433 filed on Aug. 4, 1980, now U.S. Pat. No. 4,306,965. U.S. Ser. No. 181,433 is a continuation of U.S. Ser. No. 21,575, filed on Mar. 19, 1979, which issued as U.S. Pat. No. 4,224,144 on Sept. 23, 1980.

BACKGROUND OF THE INVENTION

This invention is related to the catalytic treatment in the presence of hydrogen of hydrocarbon streams containing large concentrations of nitrogen compounds to remove nitrogen compounds therefrom and the catalyst useful therein.

In U.S. Pat. No. 4,181,602, Quick, et al., disclose a process for the hydrotreating of a heavy hydrocarbon stream wherein said stream is contacted under suitable conditions and in the presence of hydrogen with a catalyst comprising (1) the metals of molybdenum, chromium, and cobalt, (2) their oxides, (3) their sulfides, or (4) mixtures thereof on a large-pore, catalytically-active alumina, said molybdenum being present in an amount within the range of about 5 wt% to about 15 wt%, calculated as $MoO_3$ and based upon the total catalyst weight, said chromium being present in an amount within the range of about 5 wt% to about 20 wt%, calculated as $Cr_2O_3$ and based upon the total catalyst weight, said cobalt being present in an amount within the range of about 0.1 wt% to about 5 wt%, calculated as CoO and based upon the total catalyst weight, and said catalyst possessing a pore volume within the range of about 0.4 cc/gm to about 0.8 cc/gm, a surface area within the range of about 150 m²/gm to about 300 m²/gm, and an average pore diameter within the range of about 100 Å to about 200 Å.

In U.S. Pat. No. 4,224,144, Hensley, Jr., et al., disclose the catalytic hydrotreatment of petroleum distillates and similar hydrocarbon materials in the presence of a catalyst comprising a hydrogenation component comprising chromium, molybdenum, and a Group VIII metal deposited upon a porous refractory inorganic oxide support or carrier, such as alumina, silica-alumina, silica, magnesia, zirconia, and similar materials. They disclose that such a catalyst and process can be used successfully to remove nitrogen and sulfur from a hydrocarbon stream selected from petroleum distillates, tar sands distillates, and shale oil.

In U.S. Pat. No. 4,218,308, Itoh, et al., disclose a catalyst comprising a silica-alumina carrier having a silica content that is less than about 40 wt% and at least one noble metal component of Group VIII. The catalyst contains (1) pores having a diameter of smaller than 600 Å occupying at least 90% of the total pore volume and (2) pores having a diameter of 150 to 600 Å occupying at least about 40% of the total volume of pores having a diameter of smaller than 600 Å. They indicate that such catalyst, which is characterized further in that it has a specific surface area of at least about 200 m²/gm and a bulk density of less than about 0.6 gm/ml, is capable of effectively removing aromatic compounds contained in a hydrocarbon oil and is useful in the production of jet fuels, kerosene, and white oils.

In U.S. Pat. No. 4,008,149, Itoh, et al., disclose a hydro-refining catalyst and its use in a process for hydro-refining heavy hydrocarbon oils containing sulfur, nitrogen, and metal contaminants. The catalyst comprises one or more metals selected from the metals of Groups VI and VIII supported on an alumina-containing carrier containing from about 5 to about 25 wt% silica. The catalyst has a specific surface area in the range of 250 to about 300 m²/gm and a pore volume distribution characterized in that the volume of pores having a diameter of 60 to 150 Å is at least about 80% of the volume of pores having a diameter of 0 to 150 Å, the volume of pores having a diameter of 150 to 300 Å is less than about 20% of the volume of pores having a diameter of 0 to 300 Å, the volume of pores having a diameter of 0 to 600 Å is in the range of about 0.45 to about 0.60 ml/gm, and the volume of pores having a diameter of 150 to 2,000 Å is less than about 0.01 ml/gm.

Now there has been found a catalyst which comprises a hydrogenation component comprising chromium, molybdenum, and at least one metal of Group VIII and a porous alumina-silica support, which support contains silica in an amount within the range of about 10 wt% to about 50 wt%, based upon the weight of the catalyst support.

SUMMARY OF THE INVENTION

There is provided a catalytic composition and a process for the hydrodenitrogenation of a hydrocarbon stream containing a substantial amount of nitrogen compounds, such as a whole shale oil, which process employs the aforesaid catalytic composition.

The catalyst comprises a hydrogenation component deposed upon a porous alumina-silica support, said hydrogenation component comprising chromium, molybdenum, and at least one metal from Group VIII of the Periodic Table of Elements, the silica of said support being present in an amount within the range of about 10 wt% to about 50 wt%, based upon the weight of said support. Typically, the catalyst will have a surface area within the range of about 150 m²/gm to about 350 m²/gm, a pore volume within the range of about 0.4 cc/gm to about 1.0 cc/gm, and an avverage pore diameter within the range of about 60 Å (6 nm) to about 150 Å (15 nm).

The process comprises contacting the hydrocarbon stream, e.g., a whole shale oil, under hydrodenitrogenation conditions and in the presence of hydrogen with the aforesaid catalyst.

BRIEF DESCRIPTION OF THE DRAWING

The accompanying FIGURE presents the effect of the composition of the catalyst support on the product quality, when hydrotreating shale oil.

DETAILED DESCRIPTION OF THE INVENTION

The present invention is directed to a novel process for the hydrodenitrogenation of a hydrocarbon stream containing a substantial amount of nitrogen compounds and to the catalyst employed in such process.

The catalyst and the process of the present invention can be used conveniently to treat a hydrocarbon stream containing a substantial amount of nitrogen compounds. The phrase "containing a substantial amount of nitrogen compounds" refers to an amount that will result in at least 0.2 wt% nitrogen in the particular stream. Such hydrocarbon streams are selected from the group consisting of heavy petroleum hydrocarbon streams, hydrocarbon streams derived from coal, hydrocarbon streams derived from tar sands, and hydrocarbon streams derived from oil shale. Typical examples of heavy petroleum hydrocarbon streams are virgin gas oils, vacuum gas oils, or coker gas oils. Hydrocarbon streams derived from oil shale can be a whole shale oil or any fraction thereof. Such feedstocks often contain from about 0.2 wt% nitrogen to about 3.0 wt% nitrogen, or more.

Such hydrocarbon feeds often contain substantial quantities of nitrogen compounds and such nitrogen compounds must be removed therefrom to allow downstream processing and avoid low quality fuels. One way of removing such nitrogen compounds comprises the hydrodenitrogenating of the hydrocarbon stream in the presence of hydrogen, under suitable conditions, and in the presence of a suitable catalyst.

While the catalyst and process of the present invention can be used to treat a hydrocarbon stream containing a substantial amount of nitrogen compounds, they can be used also to treat a hydrocarbon stream that contains less than 0.2 wt% nitrogen.

The catalyst of the present invention, which catalyst is suitable as a catalyst for the hydrodenitrogenation of hydrocarbon streams containing a substantial amount of nitrogen compounds, is, broadly, a catalyst which comprises a hydrogenation component comprising chromium, molybdenum, and at least one metal from Group VIII of the Periodic Table of Elements deposed upon a porous alumina-silica support, the silica of said support being present in an amount within the range of about 10 wt% to about 50 wt%, based upon the weight of said support, and said chromium, molybdenum, and metal from Group VIII being present in the elemental form, as oxides, as sulfides, or mixtures thereof.

The hydrogenation component comprises chromium, molybdenum, and at least one metal from Group VIII of the Period Table of Elements. The Periodic Table of Elements can be found on page 628 of WEBSTER'S SEVENTH NEW COLLEGIATE DICTIONARY, G. & C. Merriam Company, Springfield, Mass., U.S.A. (1963). Preferably, the Group VIII metal is a non-noble metal. Cobalt and nickel are those members of Group VIII that are preferred for the catalyst of the present invention. The components of the hydrogenation component are present in the elemental form, as oxides, as sulfides, or mixtures thereof. The chromium is present in an amount within the range of about 3 wt% to about 15 wt%, calculated as $Cr_2O_3$; the molybdenum, in an amount within the range of about 5 wt% to about 25 wt%, calculated as $MoO_3$; and the metal from Group VIII, in an amount within the range of about 0.5 wt% to about 10 wt%, calculated as the oxide; each amount being based upon the weight of the catalyst. Preferably, the chromium is present in an amount within the range of about 7 wt% to about 12 wt%, calculated as $Cr_2O_3$; the molybdenum, in an amount within the range of about 12 wt% to about 18 wt%, calculated as $MoO_3$; and the metal from Group VIII, in an amount within the range of about 1 wt% to about 5 wt%, calculated as the oxide; each amount being based upon the weight of the catalyst.

The support of the catalyst is an alumina-silica support, that is, it is a mixture of silica and alumina wherein the silica is present in an amount within the range of about 10 wt% to about 50 wt%, preferably within the range of about 15 wt% to about 50 wt%, based upon the weight of said support. It is not the typical silica-alumina cracking catalyst which contains from about 65 wt% to about 95 wt% silica. Moreover, it is not the usual silica-stabilized alumina which contains up to about 5 wt% silica.

The catalyst of the present invention is prepared by depositing chromium, molybdenum, and a Group VIII metal upon a porous refractory support or carrier comprising silica and alumina, the silica being present in an amount within the range of about 10 wt% to about 50 wt%, based upon the weight of the support. A suitable method for depositing such hydrogenation metals upon the support comprises the impregnation of the support material with compounds of the metals. Desirably, after the hydrogenation metals are deposited upon the support, the material is formed into pellets, or is extruded, and then calcined.

The alumina-silica support is prepared conveniently by co-precipitation from suitable sources of silicon and aluminum, such as silica sols, alumina sols, and mixtures thereof. The sol or mixture of sols can be gelled by the addition of a suitable gelling medium, such as ammonium hydroxide, dried, and calcined.

The catalyst can be prepared by any suitable method for impregnating the hydrogenation component upon the high surface area refractory inorganic oxide support. Such impregnation can be performed with one or more solutions, usually aqueous, of heat-decomposable compounds of the appropriate metals. If a single solution is employed, the impregnation is a co-impregnation. Alternatively, sequential impregnation of the metals from 2 or more solutions can be employed. Generally, the impregnated support is dried at a temperature of at least 250° F. (121° C.) for a period of at least one hour and calcined in air at a temperature of at least 800° F. (427° C.), and preferably, at least 1,000° F. (538° C.), for at least one hour.

The finished catalyst that is employed in the process of the present invention should have a pore volume within the range of about 0.4 cc/gm to about 1.0 cc/gm, a surface area within the range of about 150 m$^2$/gm to about 350 m$^2$/gm, and an average pore diameter within the range of about 60 Angstrom units (Å) (6 nm) to about 150 Å (15 nm). Preferably, the catalyst has a pore volume within the range of about 0.4 cc/gm to about 0.8 cc/gm, a surface area within the range of about 150 m$^2$/gm to about 250 m$^2$/gm, and an average pore diameter within the range of about 110 Å (11 nm) to about 150 Å (15 nm).

Values specified for catalyst surface area were obtained by the BET nitrogen adsorption method. Values specified for pore volume herein were also obtained by nitrogen adsorption, and specified average pore diameters were those that were calculated by means of the expression:

$$A.P.D. = \frac{4 \times P.V. \times 10^4}{S.A.}$$

wherein A.P.D.=average pore diameter in Å, P.V.=pore volume in cc/gm, and S.A.=surface area in m²/gm.

The catalyst of the present invention is characterized by the following apparent pore size distribution, as would be obtained by a Digisorb 2500 instrument employing nitrogen desorption techniques: 8% to 20% of the total pore volume in pores having diameters within the range of 0 Å (0 nm) to 50 Å (5 nm); 40% to 60% of the total pore volume in pores having diameters within the range of 50 Å (5 nm) to 100 Å (10 nm); 8% to 20% of the total pore volume in pores having diameters within the range of 100 Å (10 nm) to 150 Å (15 nm); and 10% to 40% of the total pore volume in pores having diameters within the range of 150 Å (15 nm) to 1,200 Å (120 nm). The term "apparent pore size distribution" is used, since the large range of catalyst-support-composition values makes it very difficult to fix ranges of values for the pore size distribution.

In view of the above, there is provided a catalyst which comprises a hydrogenation component comprising chromium, molybdenum, and at least one metal from Group VIII of the Periodic Table of Elements deposed upon a porous alumina-silica support, the silica of said support being present in an amount within the range of about 15 wt% to about 50 wt%, based upon the weight of said support, said chromium, molybdenum, and metal from Group VIII being present in the elemental form, as oxides, as sulfides, or mixtures thereof, said catalyst having a surface area within the range of about 150 m²/gm to about 250 m²/gm, a pore volume within the range of about 0.4 cc/gm to about 0.8 cc/gm, an average pore diameter within the range of about 110 Å (11 nm) to about 150 Å (15 nm), and a pore size distribution comprising 8% to 20% of the total pore volume in pores having diameters within the range of 0 Å (0 nm) to 50 Å (5 nm), 40% to 60% of the total pore volume in pores having diameters within the range of 50 Å (5 nm) to 100 Å (10 nm), 8% to 20% of the total pore volume in pores having diameters within the range of 100 Å (10 nm) to 150 Å (15 nm), and 10% to 40% of the total pore volume in pores having diameters within the range of 150 Å (15 nm) to 1,200 Å (120 nm).

There is also provided a process for the hydrodenitrogenation of a hydrocarbon stream containing a substantial amount of nitrogen compounds, which process comprises contacting said stream in a reaction zone in the presence of hydrogen and under hydrodenitrogenation conditions with a catalyst comprising a hydrogenation component comprising chromium, molybdenum, and a least one metal from Group VIII of the Periodic Table of Elements deposed upon a porous alumina-silica support, the silica of said support being present in an amount within the range of about 15 wt% to about 50 wt%, based upon the weight of said support, said chromium, molybdenum, and metal from Group VIII being present in the elemental form, as oxides, as sulfides, or mixtures thereof, said catalyst having a surface area within the range of about 150 m²/gm to about 250 m²/gm, a pore volume within the range of about 0.4 cc/gm to about 0.8 cc/gm, an average pore diameter within the range of about 110 Å (11 nm) to about 150 Å (15 nm), and a pore size distribution comprising 8% to 20% of the total pore volume in pores having diameters within the range of 0 Å (0 nm) to 50 Å (5 nm), 40% to 60% of the total pore volume in pores having diameters within the range of 50 Å (5 nm) to 100 Å (10 nm), 8% to 20% of the total pore volume in pores having diameters within the range of 100 Å (10 nm) to 150 Å (15 nm), and 10% to 40% of the total pore volume in pores having diameters within the range of 150 Å (15 nm) to 1,200 Å (120 nm).

An advantage of the catalyst of the present invention is its high-temperature stability, i.e., its ability to perform satisfactorily at high temperatures over an extended period of time. The use of a high temperature hastens the denitrogenation reaction and does not appear to affect deleteriously the performance of the catalyst. The chromium in the hydrogenation component of the catalyst provides the high temperature stability. The combination of a Group VIII metal and molybdenum affords an active component for hydrogenation, denitrogenation and desulfurization. The presence of silica affords sufficient acidity to promote denitrogenation.

The acidity of the catalyst of the present invention can be enhanced by the addition of a halogen, for example, fluorine or chlorine.

Prior to its use in the process of the present invention, the catalyst is subjected to a sulfiding pretreatment. This sulfiding pretreatment is necessary because the metal constituents of the hydrogenation component should be in a partially-reduced state. The sulfiding will provide such partially-reduced metals, but will not reduce the metals completely to the elemental form, which form is inactive.

A convenient sulfiding pretreatment comprises heating the catalyst to a temperature within the range of about 250° F. (121° C.) to about 350° F. (177° C.), passing a gas mixture of hydrogen sulfide in hydrogen over and through the catalyst at a variable pressure for a period of about 0.5 hour to about 2 hours, raising the temperature to a value within the range of about 350° F. (177° C.) to about 450° F. (232° C.), continuing to pass the gas mixture at this latter temperature over and through the catalyst for an additional period of about 0.5 hour to about 2 hours, raising the temperature to a value of about 650° F. (343° C.) to about 750° F. (399° C.), and continuing to pass the hydrogen sulfide-hydrogen gas mixture through the catalyst for an additional period of about 0.5 hour to about 2 hours. Suitably, sufficient gas should be employed to provide about 110% of the stoichiometric amount of hydrogen sulfide needed to sulfide the metals of the hydrogenation component. The concentration of hydrogen sulfide in the gas is not critical. Subsequently, hydrogen-containing gas is introduced into the reactor and permitted to flow through the catalyst at operating pressure. A suitable flow rate for the hydrogen-containing gas is the hydrogen addition rate provided hereinbelow. The hydrocarbon feed to be treated by the process can then be introduced into the reactor.

While the above sulfiding pretreatment is a convenient way of pretreating the catalyst, other suitable methods known to those skilled in the art can be employed. For example, carbon disulfide can be added to the zone containing the catalyst, or a light hydrocarbon oil containing sulfur can be passed over the catalyst for a time that is sufficient to provide the appropriate metal sulfides on the catalyst.

The catalyst of the present invention is employed in the process of the present invention in the form of a fixed-bed or as an ebullated bed of particles. In the case of a fixed-bed catalyst, the particle size of the catalyst should be within the range of about 1/32 in (0.08 cm) to about ⅛ in (0.32 cm) effective diameter. The catalyst of the present invention can be used conveniently in a fixed-bed in the form of pellets, spheres, or extrudates. It is contemplated further that the catalyst can be present as other shapes, such as a clover leaf, cross-shaped, or C-shaped, as disclosed by Hoekstra, et al., in U.S. Pat. Nos. 3,674,680 and 3,764,565.

The conditions that are employed in the process of the present invention comprise a temperature within the range of about 700° F. (371° C.) to about 800° F. (427° C.), a hydrogen partial pressure within the range of about 1,000 psi (6,890 kPa) to about 2,500 psi (17,225 kPa), a liquid hourly space velocity (LHSV) within the range of about 0.1 volume of hydrocarbons per hour per volume of catalyst to about 5 volumes of hydrocarbon per hour per volume of catalyst, and a hydrogen recycle rate or hydrogen addition rate within the range of about 2,000 standard cubic feet of hydrogen per barrel of hydrocarbon (SCFB) (359 $m^3/m^3$) to about 20,000 SCFB (3,596 $m^3/m^3$). Preferably, the conditions comprise a temperature within the range of about 740° F. (393° C.) to about 790° F. (416° C.), a hydrogen partial pressure within the range of about 1,600 psi (11,024 kPa) to about 2,000 psi (13,780 kPa), a LHSV within the range of about 0.3 volume of hydrocarbon per hour per volumes of catalyst to about 2 volumes of hydrocarbon per hour per volume of catalyst, and a hydrogen recycle rate or hydrogen addition rate within the range of about 6,000 SCFB (1,079 $m^3/m^3$) to about 14,000 SCFB (2,517 $m^3/m^3$).

The following specific examples are being presented in order to facilitate the understanding of the present invention and are presented for the purposes of illustration only and are not intended to limit the scope of the present invention.

Eight catalysts were prepared and tested for their ability to hydrodenitrogenate a whole shale oil that had been obtained from in situ retorting of oil shale by the Occidental Petroleum Corporation. Each of the eight catalysts and the test of that particular catalyst are presented in one of the following Examples I through VIII.

EXAMPLE I

A catalyst, identified hereinafter as Catalyst A, was prepared to contain 1.5 wt% CoO, 10 wt% $Cr_2O_3$, and 10 wt% $MoO_3$ on a support of silica.

A 154-gram portion of large-mesh silica gel in the form of 8/14-mesh particles, i.e., particles that would pass through an 8-mesh screen (Tyler) but be retained upon a 14-mesh screen (Tyler), obtained from the Davison Chemical Division of W. R. Grace & Co., which had been calcined at a temperature of 1,000° F. (538° C.), was impregnated with a solution that had been prepared by dissolving 32.6 grams of $(HN_4)_2Cr_2O_7$ in 145 milliliters of distilled water. After the composite had been mixed and had been left standing for several hours, the material was put into a vacuum oven at a temperature of 212° F. (100° C.) overnight (approximately 16 hours) and then calcined for 16 hours in a static air at a temperature of 1,000° F. (538° C.).

The calcined material was then impregnated with a solution that had been prepared by dissolving 11.4 grams of $Co(NO_3)_2.6H_2O$ and 24.0 grams of $(NH_4)_6Mo_7O_{24}.4H_2O$ in distilled water and adding sufficient distilled water to make a volume of 120 milliliters of solution. The solution was poured over the catalyst and mixed therewith. Upon mixing, the solid material became dry; therefore, excess distilled water was added and mixed with the solid material periodically. The material was left overnight (approximately 16 hours) in still air at ambient temperature. The next day it was dried under a heat lamp and then in a vacuum oven for about 4 hours at a temperature of about 212° F. (100° C.). The dried material was then calcined in air at a temperature of 1,000° F. (538° C.) overnight (approximately 16 hours). The calcined material, Catalyst A, was ground subsequently to a 14/20-mesh material, i.e., a material that would pass through a 14-mesh screen (Tyler), but be retained upon a 20-mesh screen (Tyler).

Catalyst A was tested in an automated hydrotreating pilot plant, as were all of the other catalysts discussed hereinafter. This bench-scale test unit had automatic controls for pressure, flow of reactants, and temperature. The reactor was made from ⅜-inch-inside diameter, stainless steel, heavy-walled tubing. A ⅛-inch-outside diameter thermowell extended up through the center of the reactor. The reactor was heated by an electrically-heated steel block. The hydrocarbon feedstock was fed to the unit by means of a Ruska pump, a positive-displacement pump. The 14/20-mesh material was supported on 8/10-mesh alundum particles, i.e., particles that would pass through an 8-mesh screen (Tyler), but be retained upon a 10-mesh screen (Tyler). Approximately 20 cubic centimeters of the 14/20-mesh catalyst were employed as the catalyst bed in this test, as well as in each of the tests discussed hereinafter. This amount of catalyst provided a length of catalyst bed of about 10 inches to about 12 inches. A layer of 8/10-mesh alundum particles was placed over the catalyst to fill the top part of the reactor. The catalyst was located in the annular space between the thermowell and the internal wall of the ⅜-inch-inside diameter reactor.

After Catalyst A was loaded into the reactor, it was subjected to the following sulfiding pretreatment. The temperature of the catalyst bed was raised to about 300° F. (149° C.) and a mixture of 8% hydrogen sulfide in hydrogen was passed through the catalyst bed at a variable pressure. At the end of approximately 1 hour, the temperature was raised to about 400° F. (204° C.) and the hydrogen sulfide-containing gas was passed over or through the catalyst for an additional hour. Then, the temperature was raised to 700° F. (371° C.) and the hydrogen sulfide-hydrogen gas mixture was passed through the catalyst for an additional hour, at which time its flow was stopped. At least one standard cubic foot of hydrogen-hydrogen sulfide gas, preferably at least 1 standard cubic foot of gas per hour, had been passed through the catalyst bed. Hydrogen gas was then introduced into the reactor and allowed to flow through the catalyst bed at a pressure of 1,800 psi (12,402 kPa) at a flow rate of about 15 liters per hour. The Ruska pump was started, hydrocarbon feed was permitted to flow through the reactor, and the temperature of the catalyst bed was raised to the appropriate reaction temperature. Effluent from the reaction zone was passed into a gas-liquid, high-pressure separator, wherein the gas was separated from the liquid. The gas was passed through a pressure control valve and a wet test meter to an appropriate vent. The liquid product was passed through a pressure control valve to a liquid product receiver.

Catalyst A was tested at a liquid feed rate of 10.3 cubic centimeters per hour, i.e., a LHSV of 0.5 volume of hydrocarbon per hour per volume of catalyst, and a catalyst bed temperature of approximately 780° F. (416° C).

The feedstock that was employed in this test, as well as in the tests of the other examples, was a whole shale oil that had been obtained by in situ retorting of oil shale by the Occidental Petroleum Corporation. The properties of the feed, hereinafter identified as Feed A, are presented hereinbelow in Table I.

TABLE I-continued

| FEED PROPERTIES | |
|---|---|
| Fe, ppm | 41 |
| Ni | 10 |
| V | about 1 |
| As | 26 |
| Na | about 12 |
| Mo | 3 |

The results of this test, Test No. 1, are presented hereinafter in Table II.

TABLE II

DATA FOR TEST NO. 1, CATALYST A

| Period No. | 1 | 2 | 3 | 4 | 5 | 6 |
|---|---|---|---|---|---|---|
| Hours on Stream | 19 | 43 | 67 | 91 | 115 | 139 |
| Temperature, | | | | | | |
| °F. | 780 | — | 780 | 780 | 780 | 780 |
| °C. | 416 | — | 416 | 416 | 416 | 416 |
| Pressure, psig | 1,800 | 1,800 | 1,800 | 1,800 | 1,800 | 1,800 |
| kPa | 12,402 | 12,402 | 12,402 | 12,402 | 12,402 | 12,402 |
| LHSV, hr$^{-1}$ | 0.5 | 0.5 | 0.5 | 0.5 | 0.5 | 0.5 |
| Gravity, °API | 36.1 | 36.1 | 36.5 | 36.1 | 36.2 | 36.3 |
| Carbon, wt % | — | — | — | — | 86.40 | — |
| Hydrogen, wt % | — | — | — | — | 13.25 | — |
| Nitrogen, ppm | 2,530 | 2,790 | 2,800 | 3,260 | 3,330 | 3,000 |
| Sulfur, ppm | 259 | 220 | 217 | 217 | 150 | 121 |
| Pour Point, | | | | | | |
| °F. | — | — | — | — | 80 | — |
| °C. | — | — | — | — | 27 | — |
| Viscosity, cst (40° C.) | — | — | — | — | 4.80 | — |
| IBP, | | | | | | |
| °F. | — | — | — | — | 192 | — |
| °C. | — | — | — | — | 89 | — |
| IBP - 360° F. (182° C.), wt % | — | — | — | — | 9.7 | — |
| 360° F. (182° C.)-650° F. (343° C.), wt % | — | — | — | — | 57.8 | — |
| 650° F.+ (343° C.+), wt % | — | — | — | — | 32.5 | — |
| FBP, | | | | | | |
| °F. | — | — | — | — | 945 | — |
| °C. | — | — | — | — | 507 | — |
| Gas rate, SCFB × 10$^3$ | — | — | — | — | 12.9 | — |
| Hydrogen consumption, SCFB | — | — | — | — | 1,000 | — |
| Wt % recovered | — | — | — | — | 102 | — |
| Wt % C$_1$-C$_4$ on Feed | — | — | — | — | 2.5 | — |

TABLE I

| FEED PROPERTIES | |
|---|---|
| GRAVITY, °API | 23.8 |
| CARBON, wt % | 84.87 |
| HYDROGEN, wt % | 11.84 |
| NITROGEN, wt % | 1.32 |
| SULFUR, wt % | 0.64 |
| OXYGEN, wt % | 1.33 |
| POUR POINT | |
| °F. | 60 |
| °C. | 16 |
| VISCOSITY cst | |
| (40° C.) | 32.9 |
| (100° C.) | 5.10 |
| RAMSBOTTOM CARBON, wt % | 1.22 |
| ASTM DISTILLATION, °F. | |
| IBP | 290 |
| 5% | 404 |
| 30% | 566 |
| 60% | 744 |
| % at 1,000° F. | 87.2 |
| IBP - 360° F. (182° C.), wt % | 1.5 |
| 360° F. (182° C.)-650° F. (343° C.), wt % | 45.8 |
| 650° F.+ (343° C.+), wt % | 52.7 |

EXAMPLE II

A second catalyst, identified hereinafter as Catalyst B, was prepared to contain 1.5 wt% CoO, 10 wt% Cr$_2$O$_3$, and 10 wt% MoO$_3$ on a support of alumina.

A 617-gram portion of Aero 100A alumina 1/16-inch (0.159-cm) extrudates, obtained from the American Cyanamid Company and calcined in air at 1,000° F. (538° C.) for at least 1 hour, was impregnated with a solution that had been prepared by dissolving 132.8 grams of (NH$_4$)$_2$Cr$_2$O$_7$ and 98.12 grams of (NH$_4$)$_6$Mo$_7$O$_{24}$.4H$_2$O in 300 milliliters of distilled water. In making up the solution, it was stirred for approximately one-half hour and distilled water was added to make 600 cubic centimeters of solution. Since not all of the solids had been dissolved, approximately 50 cubic centimeters of dilute ammonium hydroxide were added, the solution was filtered, and sufficient water was added to bring the total amount of solution up to 700 cubic centimeters. The addition of the solution to the 617 grams of alumina resulted in a slurry. The excess solution became a cloudy orange upon standing. The mixture was shaken occasionally and was left standing catalyst was somewhat better than the silica-supported catalyst for nitrogen removal.

TABLE III

| | DATA FOR TEST NO. 2, CATALYST B | | | | | |
|---|---|---|---|---|---|---|
| Period No. | 1 | 2 | 3 | 4 | 5A | 6 |
| Hours on Stream | 41 | 65 | 89 | 113 | 137 | 161 |
| Temperature, | | | | | | |
| °F. | 780 | — | 779 | 780 | 780 | 780 |
| °C. | 416 | — | 415 | 416 | 416 | 416 |
| Pressure, psig | 1,800 | 1,800 | 1,800 | 1,800 | 1,800 | 1,800 |
| kPa | 12,402 | 12,402 | 12,402 | 12,402 | 12,402 | 12,402 |
| LHSV, hr$^{-1}$ | 0.5 | 0.5 | 0.5 | 0.5 | 0.5 | 0.5 |
| Gravity, °API | 39.0 | 38.7 | 39.0 | 38.6 | 38.6 | 38.5 |
| Carbon, wt % | — | — | — | — | 86.33 | — |
| Hydrogen, wt % | — | — | — | — | 13.64 | — |
| Nitrogen, ppm | 99 | 144 | 155 | 153 | 161 | 143 |
| Sulfur, ppm | 430 | 96 | 147 | 378 | 112 | 211 |
| Pour Point, | | | | | | |
| °F. | — | — | — | — | 75 | — |
| °C. | — | — | — | — | 24 | — |
| Viscosity, cst (40° C.) | — | — | — | — | 3.46 | — |
| IBP, | | | | | | |
| °F. | — | — | — | — | 123 | — |
| °C. | — | — | — | — | 51 | — |
| IBP - 360° F. (182° C.), wt % | — | — | — | — | 14.1 | — |
| 360° F. (182° C.)-650° F. (343° C.), wt % | — | — | — | — | 61.4 | — |
| 650° F.+ (343° C.+), wt % | — | — | — | — | 24.5 | — |
| FBP, | | | | | | |
| °F. | — | — | — | — | 929 | — |
| °C. | — | — | — | — | 498 | — |
| Gas rate, SCFB × 10$^3$ | — | — | — | — | 10.5 | — |
| Hydrogen consumption, SCFB | — | — | — | — | 1,268 | — |
| Wt % recovered | — | — | — | — | 98.8 | — |
| Wt % C$_1$-C$_4$ on Feed | — | — | — | — | 2.60 | — | overnight (approximately 16 hours). Since the mixture still contained liquid, it was dried under a heat lamp with stirring. It was then left standing at room temperature over the weekend (approximately 64 hours). The material was then dried in air overnight at a temperature of 212° F. (100° C.). It was screened to remove alumina chips and powder. Subsequently it was calcined in air at a temperature of 1,000° F. (538° C.) for one hour.

A 193-gram portion of the calcined material was impregnated with a solution that had been prepared by dissolving 11.65 grams of Co(NO$_3$)$_2$.6H$_2$O in 130 cubic centimeters of distilled water. The solution was added slowly to the solid material to provide only a very slight excess of free solution. The material was then dried under a heat lamp with occasional stirring for approximately 1 hour, dried in an oven in air at a temperature of 212° F. (100° C.) for 20 hours, and calcined in air at a temperature of 1,000° F. (538° C.) for 1 hour. The calcined material, Catalyst B, was ground and screened to a 14/20-mesh material, i.e., a material that would pass through a 14-mesh screen (Tyler), but be retained upon a 20-mesh screen (Tyler).

A 20-cubic centimeter sample of Catalyst B was charged to the reactor of a bench-scale test unit, pretreated, and tested with Feed A, as described in Example I hereinabove. The results of this test, Test No. 2, are presented hereinbelow in Table III.

A comparison of the results obtained in Test No. 1 to those in Test No. 2 shows that the alumina-supported

EXAMPLE III

A third catalyst, identified hereinafter as Catalyst C, was prepared to contain 1.5 wt% CoO, 10 wt% Cr$_2$O$_3$, and 15 wt% MoO$_3$ on alumina.

A 147-gram quantity of Aero 100A alumina, obtained from American Cyanamid Company, in the form of 1/16-inch (0.159 cm) extrudates was impregnated with a solution that had been prepared by dissolving 33.2 grams of (NH$_4$)$_2$Cr$_2$O$_7$ in 145 milliliters of distilled water. The alumina extrudates had been calcined in air at a temperature of 1,000° F. (538° C.) for at least 1 hour prior to the impregnation. The solution and extrudates were thoroughly mixed. Upon standing for a period of time, the mixture was heated overnight (about 16 hours) in a vacuum oven at a temperature of about 212° F. (100° C.). Then the dried material was calcined in air at a temperature of 1,000° F. (538° C.) for 3 hours.

The calcined material was impregnated with a solution that had been prepared by dissolving 11.65 grams of Co(NO$_3$)$_2$.6H$_2$O and 36.8 grams of (NH$_4$)$_6$Mo$_7$O$_{24}$.4H$_2$O in sufficient distilled water to make 120 milliliters of solution. The mixture of solution and calcined solid was allowed to stand for 1 hour, dried in a vacuum oven for 2 hours at a temperature of 212° F. (100° C.), and calcined at a temperature of 1,000° F. (538° C.) overnight (approximately 16 hours).

The resulting calcined catalyst, Catalyst C, was ground and screened to a 14/20-mesh material.

A 20-cubic centimeter sample of Catalyst C was charged to the reactor of a bench-scale test unit, pretreated, and tested with Feed A, as described in Example I hereinabove. The results of this test, Test No. 3, are presented hereinbelow in Table IV.

A comparison of the results obtained in Test No. 2 to those in Test No. 3 shows that the catalyst containing the 15 wt% $MoO_3$ was slightly better for nitrogen removal.

TABLE IV

DATA FOR TEST NO. 3, CATALYST C

| Period No. | 1 | 2 | 3 | 4 | 5 | 6 | 7 |
|---|---|---|---|---|---|---|---|
| Hours on Stream | 19 | 43 | 67 | 91 | 115 | 139 | 163 |
| Temperature, | | | | | | | |
| °F. | 779 | — | — | 780 | 780 | 780 | 780 |
| °C. | 415 | — | — | 416 | 416 | 416 | 416 |
| Pressure, psig | 1,800 | 1,800 | 1,800 | 1,800 | 1,800 | 1,800 | 1,800 |
| kPa | 12,402 | 12,402 | 12,402 | 12,402 | 12,402 | 12,402 | 12,402 |
| LHSV, $hr^{-1}$ | 0.5 | 0.5 | 0.5 | 0.5 | 0.5 | 0.5 | 0.5 |
| Gravity, °API | 39.9 | 39.0 | 39.1 | 39.1 | 39.0 | 39.2 | 39.2 |
| Carbon, wt % | — | — | — | — | — | — | 86.32 |
| Hydrogen, wt % | — | — | — | — | — | — | 13.65 |
| Nitrogen, ppm | 78 | 82 | 83 | 88 | 82 | 116 | 110 |
| Sulfur, ppm | 358 | 120 | 293 | 122 | 183 | — | 117 |
| Pour Point, | | | | | | | |
| °F. | — | — | — | — | — | — | 80 |
| °C. | — | — | — | — | — | — | 26 |
| Viscosity, cst (40° C.) | — | — | — | — | — | — | 3.24 |
| IBP, | | | | | | | |
| °F. | — | — | — | — | — | — | 5 |
| °C. | — | — | — | — | — | — | −15 |
| IBP - 360° F. (182° C.), wt % | — | — | — | — | — | — | 15.1 |
| 360° F. (182° C.)–650° F. (343° C.), wt % | — | — | — | — | — | — | 60.9 |
| 650° F.+ (343° C.+), wt % | — | — | — | — | — | — | 24.0 |
| FBP, | | | | | | | |
| °F. | — | — | — | — | — | — | 915 |
| °C. | — | — | — | — | — | — | 491 |
| Gas rate, SCFB × $10^3$ | — | — | — | — | — | — | 10.0 |
| Hydrogen consumption, SCFB | — | — | — | — | — | — | 1,280 |
| Wt % recovered | — | — | — | — | — | — | 103.2 |
| Wt % $C_1$–$C_4$ on Feed | — | — | — | — | — | — | 2.90 |

EXAMPLE IV

A fourth catalyst, identified hereinafter as Catalyst D, was prepared to contain 1.5 wt% CoO, 10 wt% $Cr_2O_3$, and 15 wt% $MoO_3$ on a support of 20 wt% silica and 80 wt% alumina.

A catalytic alumina-silica support material, obtained from the Nalco Chemical Company and containing 20 wt% silica, was ground and screened to a 14/20-mesh material and calcined in air overnight (approximately 16 hours) at a temperature of 1,000° F. (538° C.).

A 25-gram portion of this calcined support material was impregnated with a solution that had been prepared by dissolving 5.63 grams of $(NH_4)_2Cr_2O_7$ in 25 milliliters of distilled water. The mixture was allowed to stand for 6 hours and calcined in air at a temperature of 1,000° F. (538° C.) over the weekend (approximately 64 hours).

The calcined material was impregnated with a solution that had been prepared by dissolving 1.98 grams of $Co(NO_3)_2.6H_2O$ and 6.23 grams of $(NH_4)_6Mo_7O_{24}.4H_2O$ in 25 milliliters of distilled water. After thoroughly mixing, the mixture was permitted to stand for 6 hours and then calcined in air at 1,000° F. (538° C.) overnight (approximately 16 hours).

A 20-cubic centimeter of the resulting calcined material, Catalyst D, was charged to the reactor of a bench-scale test unit, pretreated, and tested with Feed A, as described hereinabove in Example I. The results of this test, Test No. 4, are presented hereinbelow in Table V.

A comparison of the four experimental catalysts discussed hereinabove clearly demonstrates that the catalyst having a support of 20 wt% silica and 80 wt% alumina is far superior to a catalyst having either a silica support or an alumina support, when each is used for the hydrodenitrogenation of a nitrogen-containing feedstock.

TABLE V

DATA FOR TEST NO. 4, CATALYST D

| Period No. | 1 | 2 | 3 | 4 | 5 | 6 | 7 | 8 |
|---|---|---|---|---|---|---|---|---|
| Hours on Stream | 22 | 46 | 70 | 94 | — | — | — | — |
| Temperature, | | | | | | | | |
| °F. | 781 | 780 | — | — | 781 | 781 | — | — |
| °C. | 417 | 416 | — | — | 417 | 417 | — | — |
| Pressure, psig | 1,800 | 1,800 | 1,800 | 1,800 | 1,800 | 1,800 | 1,800 | 1,800 |
| kPa | 12,402 | 12,402 | 12,402 | 12,402 | 12,402 | 12,402 | 12,402 | 12,402 |
| LHSV, $hr^{-1}$ | 0.5 | 0.5 | 0.5 | 0.5 | 0.5 | 0.5 | 0.5 | 0.5 |
| Gravity, °API | 39.9 | 40.0 | 39.8 | 39.7 | 39.8 | 39.7 | 39.2 | 39.0 |

TABLE V-continued

DATA FOR TEST NO. 4, CATALYST D

| Period No. | 1 | 2 | 3 | 4 | 5 | 6 | 7 | 8 |
|---|---|---|---|---|---|---|---|---|
| Carbon, wt % | — | 86.19 | — | — | — | 86.35 | — | — |
| Hydrogen, wt % | — | 13.80 | — | — | — | 13.63 | — | — |
| Nitrogen, ppm | 2 | 8 | 9 | 8 | 7 | 8 | 14 | 8 |
| Sulfur, ppm | 247 | 103 | 196 | 315 | 54 | 165 | 150 | 281 |
| Pour Point, | | | | | | | | |
| °F. | — | 70 | — | — | — | 65 | — | — |
| °C. | — | 21 | — | — | — | 18 | — | — |
| Viscosity, cst (40° C.) | — | 2.92 | — | — | — | 3.0 | — | — |
| IBP, | | | | | | | | |
| °F. | — | 36 | — | — | — | 73 | — | — |
| °C. | — | 2 | — | — | — | 23 | — | — |
| IBP - 360° F. (182° C.), wt % | — | 19.7 | — | — | — | 14.9 | — | — |
| 360° F. (182° C.)-650° F. (343° C.), wt % | — | 60.4 | — | — | — | 51.5 | — | — |
| | — | 23.5 | — | — | | | | |
| | — | 23.5 | — | — | | | | |
| 650° F.+ (343° C.+), wt % | — | 19.9 | — | — | | | | |
| FBP, | | | | | | | | |
| °F. | — | 950 | — | — | — | 902 | — | — |
| °C. | — | 510 | — | — | — | 483 | — | — |
| Gas rate, SCFB × 10³ | — | 12.1 | — | — | — | 11.8 | — | — |
| Hydrogen consumption, SCFB | — | 1,384 | — | — | — | 1,278 | — | — |
| Wt % recovered | — | 98 | — | — | — | 96 | — | — |
| Wt % $C_1-C_4$ on Feed | — | 2.92 | — | — | — | 3.02 | — | — |

EXAMPLE V

A fifth catalyst, identified hereinafter as Catalyst E, was prepared to contain 1.5 wt% CoO, 10 wt% $Cr_2O_3$, and 15 wt% $MoO_3$ on a support of 30 wt% silica and 70 wt% alumina.

A catalytic alumina-silica supported material, obtained from the Nalco Chemical Company and containing 30 wt% silica, was calcined in air at 1,000° F. (538° C.) for a least 1 hour.

A 147-gram quantity of the calcined support material, as 5/64-inch (0.794-cm) extrudates, was impregnated with a solution that had been prepared by dissolving 33.2 grams of $(NH_4)_2Cr_2O_7$ in 145 milliliters of distilled water. The resulting composite was allowed to stand for 6 hours and then calcined in air at a temperature of 1,000° F. (538° C.) over the weekend (approximately 64 hours).

The resulting calcined material was impregnated with a solution that had been prepared by dissolving 11.65 grams of $Co(NO_3)_2.6H_2O$ and 41.71 grams of $(NH_4)_6Mo_7O_{24}.4H_2O$ in 140 milliliters of distilled water. The impregnated composite was allowed to stand for 6 hours and was then calcined in air at a temperature of 1,000° F. (538° C.) overnight (approximately 16 hours). The resulting catalyst, Catalyst E, was ground and screened to a 14/20-mesh material.

A 20-cubic centimeter portion of Catalyst E was charged to the reactor of a bench-scale test unit, pretreated, and tested with Feed A, as described hereinabove in Example I. The results of this test, Test No. 5, are presented hereinbelow in Table VI.

TABLE VI

DATA FOR TEST NO. 5, CATALYST E

| Period No. | 1 | 2 | 3 | 4 | 5 | 6 | 7 |
|---|---|---|---|---|---|---|---|
| Hours on Stream | 21 | 45 | 69 | 93 | 117 | 141 | 165 |
| Temperature, | | | | | | | |
| °F. | 781 | 780 | — | — | 780 | 780 | 781 |
| °C. | 417 | 416 | — | — | 416 | 416 | 417 |
| Pressure, psig | 1,800 | 1,800 | 1,800 | 1,800 | 1,800 | 1,800 | 1,800 |
| kPa | 12,402 | 12,402 | 12,402 | 12,402 | 12,402 | 12,402 | 12,402 |
| LHSV, $hr^{-1}$ | 0.5 | 0.5 | 0.5 | 0.5 | 0.5 | 0.5 | 0.5 |
| Gravity, °API | 40.5 | 39.6 | 39.4 | 39.4 | 39.4 | 39.8 | 39.4 |
| Carbon, wt % | — | — | — | — | — | 86.30 | — |
| Hydrogen, wt % | — | — | — | — | — | 13.68 | — |
| Nitrogen, ppm | 67 | 42 | 26 | 33 | 18 | 58 | 8 |
| Sulfur, ppm | 460 | 199 | 168 | 172 | 128 | 56 | 59 |
| Pour Point, | | | | | | | |
| °F. | — | — | — | — | — | 65 | — |
| °C. | — | — | — | — | — | 18 | — |
| Viscosity, cst (40° C.) | — | — | — | — | — | 3.03 | — |
| IBP, | | | | | | | |
| °F. | — | — | — | — | — | 125 | — |
| °C. | — | — | — | — | — | 52 | — |
| IBP - 360° F. (182° C.), wt % | — | — | — | — | — | 12.9 | — |
| 360° F. (182° C.)- | — | — | — | — | — | 59.3 | — |

TABLE VI-continued

| | DATA FOR TEST NO. 5, CATALYST E | | | | | | |
|---|---|---|---|---|---|---|---|
| Period No. | 1 | 2 | 3 | 4 | 5 | 6 | 7 |
| 650° F. (343° C.), wt % | | | | | | | |
| 650° F.+ (343° C.+), wt % | — | — | — | — | — | 28.8 | — |
| FBP, | | | | | | | |
| °F. | — | — | — | — | — | 1,000+ | — |
| °C. | — | — | — | — | — | 538+ | — |
| Gas rate, SCFB × 10³ | — | — | — | — | — | 13.9 | — |
| Hydrogen consumption, SCFB | — | — | — | — | — | 1,216 | — |
| Wt % recovered | — | — | — | — | — | 99.0 | — |
| Wt % C₁-C₄ on Feed | — | — | — | — | — | 3.28 | — |

EXAMPLE VI

A sixth catalyst, identified hereinafter as Catalyst F, was prepared to contain 1.5 wt% CoO, 10 wt% $Cr_2O_3$, and 15 wt% $MoO_3$ on a support of 50 wt% silica and 50 wt% alumina.

The catalyst support for Catalyst F was prepared by adding 691 grams of an Aero 1,000 PHF-alumina sol (69.1 grams of alumina) obtained from the American Cyanamid Company to 3,000 grams of a sol containing 113.18 grams of silica (72 wt%) and 44.02 grams of alumina (28 wt%) and obtained from the American Cyanamid Company. The resulting mixture was blended in a blender and 400 cubic centimeters of a solution prepared from equal parts of distilled water and concentrated ammonium hydroxide (28–30% $NH_4OH$) were added to the blend, and blending continued until a thin paste formed.

Three batches were made and combined. A liter of solution prepared from equal parts of distilled water and concentrated ammonium hydroxide was added to the composite, which then was left standing for 24 hours. Subsequently, the material was dried in an oven in air at a temperature of 250° F. (121° C.) for several days until dry, ground, and screened to pass through a 100-mesh screen (Tyler). The ground material was mulled with distilled water, a small amount of PHF-alumina was added thereto, and the resulting composition was extruded to 5/64-inch (0.794-cm) extrudates. The extrudates were dried overnight (approximately 16 hours) in air at a temperature of 250° F. (121° C.) and calcined in air for 4 hours at a temperature of 1,000° F. (538° C.).

A 147-gram portion of the calcined support material was impregnated with a solution that had been prepared by dissolving 33.2 grams of $(NH_4)_2Cr_2O_7$ in 140 milliliters of distilled water. The resulting composite was allowed to stand for 1 hour and dried under a heat lamp. The dried material was impregnated with a solution that had been prepared by dissolving 36.8 grams of $(NH_4)_6Mo_7O_{24}.4H_2O$ followed by 11.65 grams of $Co(NO_3)_2.6H_2O$ in distilled water and adding sufficient distilled water to make 130 cubic centimeters of solution. After standing for 1 hour, the mixture was dried under a heat lamp and calcined in air for 1 hour at a temperature of 1,000° F. (538° C.).

A 20-cubic centimeter sample of this catalyst, Catalyst F, was charged, as 14/20-mesh material, to the reactor of a bench-scale test unit, pretreated, and tested with Feed A, as described hereinabove in Example I. The results of this test, Test No. 6, are presented hereinbelow in Table VII.

TABLE VII

| | DATA FOR TEST NO. 6, CATALYST F | | | | | | |
|---|---|---|---|---|---|---|---|
| Period No. | 1 | 2 | 3 | 4 | 5 | 6 | 7 |
| Hours on Stream | 23 | 47 | 71 | 95 | 119 | 143 | 167 |
| Temperature, | | | | | | | |
| °F. | 781 | 782 | 781 | — | — | 780 | 780 |
| °C. | 417 | 417 | 417 | — | — | 416 | 416 |
| Pressure, psig | 1,800 | 1,800 | 1,800 | 1,800 | 1,800 | 1,800 | 1,800 |
| kPa | 12,402 | 12,402 | 12,402 | 12,402 | 12,402 | 12,402 | 12,402 |
| LHSV, hr⁻¹ | 0.5 | 0.5 | 0.5 | 0.5 | 0.5 | 0.5 | 0.5 |
| Gravity, °API | 40.3 | 39.6 | 38.5 | 38.7 | 39.0 | 38.7 | 39.0 |
| Carbon, wt % | — | — | — | — | — | — | 86.4 |
| Hydrogen, wt % | — | — | — | — | — | — | 13.6 |
| Nitrogen, ppm | 166 | 323 | 109 | 25 | 16 | 18 | 20 |
| Sulfur, ppm | 650 | 540 | 150 | 219 | 257 | 67 | 70 |
| Pour Point, | | | | | | | |
| °F. | — | — | — | — | — | — | 75 |
| °C. | — | — | — | — | — | — | 24 |
| Viscosity, cst (40° C.) | — | — | — | — | — | — | 3.4 |
| IBP, | | | | | | | |
| °F. | — | — | — | — | — | — | 104 |
| °C. | — | — | — | — | — | — | 41 |
| IBP - 360° F. (182° C.), wt % | — | — | — | — | — | — | 13.9 |
| 360° F. (182° C.)-650° F. (343° C.), wt % | — | — | — | — | — | — | 58.3 |
| 650° F.+ (343° C.+), wt % | — | — | — | — | — | — | 27.8 |

TABLE VII-continued

DATA FOR TEST NO. 6, CATALYST F

| | | | | | | | |
|---|---|---|---|---|---|---|---|
| FBP, | | | | | | | |
| °F. | — | — | — | — | — | — | 971 |
| °C. | — | — | — | — | — | — | 522 |
| Gas rate, SCFB × 10³ | — | — | — | — | — | — | 18.1 |
| Hydrogen consumption, SCFB | — | — | — | — | — | — | 1,251 |
| Wt % recovered | — | — | — | — | — | — | 99.3 |
| Wt % $C_1$-$C_4$ on Feed | — | — | — | — | — | — | 3.0 |

| Period No. | 8 | 9 | 10 | 11 | 12 | 13 | 14 |
|---|---|---|---|---|---|---|---|
| Hours on Stream | 191 | 215 | 239 | 263 | 287 | 311 | 335 |
| Temperature, | | | | | | | |
| °F. | 780 | 780 | 780 | — | — | 780 | 778 |
| °C. | 416 | 416 | 416 | — | 415 | — | — |
| Pressure, psig | 1,800 | 1,800 | 1,800 | 1,800 | 1,800 | 1,800 | 1,800 |
| kPa | 12,402 | 12,402 | 12,402 | 12,402 | 12,402 | 12,402 | 12,402 |
| LHSV, hr⁻¹ | 0.5 | 0.5 | 0.5 | 0.5 | 0.5 | 0.5 | 0.5 |
| Gravity, °API | 37.9 | 37.6 | 37.7 | 37.8 | 37.8 | 37.7 | 38.5 |
| Carbon, wt % | — | — | — | — | — | — | 86.3 |
| Hydrogen, wt % | — | — | — | — | — | — | 13.6 |
| Nitrogen, ppm | 37 | 38 | 31 | 29 | 42 | 38 | — |
| Sulfur, ppm | 236 | 164 | 208 | 246 | 160 | 213 | 345 |
| Pour Point, | | | | | | | |
| °F. | — | — | — | — | — | — | — |
| °C. | — | — | — | — | — | — | — |
| Viscosity, cst (40° C.) | — | — | — | — | — | — | — |
| IBP, | | | | | | | |
| °F. | — | — | — | — | — | — | 96 |
| °C. | — | — | — | — | — | — | 36 |
| IBP - 360° F. (182° C.), wt % | — | — | — | — | — | — | 13.0 |
| 360° F. (182° C.)- 650° F. (343° C.) wt % | — | — | — | — | — | — | 59.2 |
| 650° F.+ (343° C.+), wt% | — | — | — | — | — | — | 27.8 |
| FBP, | | | | | | | |
| °F. | — | — | — | — | — | — | 924 |
| °C. | — | — | — | — | — | — | 495 |
| Gas rate, SCFB × 10³ | — | — | — | — | — | — | 14.8 |
| Hydrogen consumption, SCFB | — | — | — | — | — | — | 1,206 |
| Wt % recovered | — | — | — | — | — | — | 101 |
| Wt % $C_1$-$C_4$ on Feed | — | — | — | — | — | — | 1.3 |

EXAMPLE VII

A seventh catalyst, identified hereinafter as Catalyst G, was prepared to contain 1.5 wt% CoO, 10 wt% $Cr_2O_3$, and 15 wt% $MoO_3$ on a support of 10 wt% silica and 90 wt% alumina.

The support was prepared by mixing 3,015 grams of an Aero 1000 PHF-alumina sol (301 grams of alumina), obtained from the American Cyanamid Company, with 922 grams of an alumina-silica sol (35 grams of silica and 13.5 grams of alumina), obtained from the American Cyanamid Company, in a blender. To this mixture were added 400 cubic centimeters of a solution that had been prepared from equal parts of distilled water and concentrated ammonium hydroxide. The mixture was blended.

Two batches were made and combined. To this composite were added 1.5 liters of a solution that had been prepared from equal parts of distilled water and concentrated ammonium hyroxide. The resulting mixture was allowed to stand for 24 hours and then dried at a temperature of 250° F. (121° C.) for several days until dry. The dried material was ground and screened to 100-mesh material. It was then mulled with distilled water. Since too much water had been added, a small amount of Catapal SB alumina was added thereto. The material was then extruded to 5/64-inch extrudates, dried in air overnight (approximately 16 hours) at a temperature of 250° F. (121° C.), and calcined in air for 4 hours at a temperature of 1,000° F. (538° C.).

The support material was impregnated in the same manner as described for Catalyst F in Example VI hereinabove.

A 20-cubic centimeter sample of Catalyst G was charged, as 14/20-mesh material, to the reactor of a bench-scale test unit, pretreated, and tested with Feed A, as described hereinabove in Example I. The results of this test, Test No. 7, are presented hereinbelow in Table VIII.

TABLE VIII

| | DATA FOR TEST NO. 7, CATALYST G | | | | | | | | | |
|---|---|---|---|---|---|---|---|---|---|---|
| Period No. | 1 | 2 | 3 | 4 | 5 | 6 | 7 | 8 | 9 | 10 |
| Hours on Stream | 18 | 42 | 66 | 90 | 114 | 138 | 162 | 186 | 210 | 234 |
| Temperature, | | | | | | | | | | |

TABLE VIII-continued

| | DATA FOR TEST NO. 7, CATALYST G | | | | | | | | | |
|---|---|---|---|---|---|---|---|---|---|---|
| Period No. | 1 | 2 | 3 | 4 | 5 | 6 | 7 | 8 | 9 | 10 |
| °F. | 780 | 781 | — | — | — | — | — | — | — | — |
| °C. | 416 | 417 | — | — | — | — | — | — | — | — |
| Pressure, psig | 1,800 | 1,800 | 1,800 | 1,800 | 1,800 | 1,800 | 1,800 | 1,800 | 1,800 | 1,800 |
| kPa | 12,402 | 12,402 | 12,402 | 12,402 | 12,042 | 12,402 | 12,402 | 12,402 | 12,402 | 12,402 |
| LHSV, hr$^{-1}$ | 0.5 | 0.5 | 0.5 | 0.5 | 0.5 | 0.5 | 0.5 | 0.5 | 0.5 | 0.5 |
| Gravity, °API | 40.4 | 38.5 | 38.6 | 38.5 | 38.4 | 37.8 | 38.0 | 38.5 | 38.0 | 37.2 |
| Carbon, wt % | — | — | — | — | — | — | 86.3 | — | — | — |
| Hydrogen, wt % | — | — | — | — | — | — | 13.7 | — | — | — |
| Nitrogen, ppm | 100 | 260 | 140 | 100 | 100 | 820 | 320 | 90 | 250 | — |
| Sulfur, ppm | 530 | 372 | 324 | 232 | 353 | 460 | 153 | 180 | 500 | 980 |
| Pour Point, | | | | | | | | | | |
| °F. | — | — | — | — | — | — | 75 | — | — | 30 |
| °C. | — | — | — | — | — | — | 24 | — | — | −1 |
| Viscosity, cst (40° C.) | — | — | — | — | — | — | 3.47 | — | — | 3.87 |
| IBP, | | | | | | | | | | |
| °F. | — | — | — | — | — | — | 100 | — | — | 106 |
| °C. | — | — | — | — | — | — | 38 | — | — | 41 |
| IBP - 360° F. (182° C.), wt % | — | — | — | — | — | — | 16.2 | — | — | 12.4 |
| 360° F. (182° C.)–650° F. (343° C.), wt % | — | — | — | — | — | — | 47.8 | — | — | 57.0 |
| 650° F.+ (343° C.+), wt % | — | — | — | — | — | — | 36.0 | — | — | 30.6 |
| FBP, | | | | | | | | | | |
| °F. | — | — | — | — | — | — | 1,000+ | — | — | 953 |
| °C. | — | — | — | — | — | — | 538+ | — | — | 512 |
| Gas rate, SCFB × 10$^3$ | — | — | — | — | — | — | 17.9 | — | — | — |
| Hydrogen consumption, SCFB | — | — | — | — | — | — | 1,361− | — | — | — |
| Wt % recovered | — | — | — | — | — | — | 102.3 | — | — | — |
| Wt % C$_1$–C$_4$ on Feed | — | — | — | — | — | — | 5.0 | — | — | — |

EXAMPLE VIII

An eighth catalyst, identified hereinafter as Catalyst H, was prepared to contain 1.5 wt% CoO, 10 wt% $Cr_2O_3$, and 15 wt% $MoO_3$ on a support of 70 wt% silica and 30 wt% alumina.

The support material, containing 70 wt% silica and 30 wt% alumina, was obtained from W. R. Grace and Co.

A 147-gram portion of this support material, as ⅛-inch (0.318-cm) pellets, was impregnated with a solution that had been prepared by dissolving 33.2 grams of $(NH_4)_2Cr_2O_7$ in 140 milliliters of distilled water. The resulting composite was allowed to stand for 1 hour and dried under a heat lamp and in an oven overnight (approximately 16 hours) at a temperature of 250° F. (121° C.). The dried material was then calcined in air at a temperature of 1,000° F. (538° C.) for about 4 hours.

The calcined material was impregnated with a solution that had been prepared by dissolving 33.2 grams of $(NH_4)_6Mo_7O_{24}.4H_2O$ and 11.68 grams of $Co(NO_3)_2.6H_2O$ in distilled water and adding sufficient distilled water to make 125 cubic centimeters of solution. After standing for about 0.5 hour, the composite was dried under a heat lamp for about 0.5 hour and then in an oven for 1 hour at a temperature of about 250° F. (121° C.). The dried material was calcined in air overnight (approximately 16 hours) at a temperature of 1,000° F. (538° C.).

A 20-cubic centimeter sample of Catalyst H was charged, as 14/20-mesh material, to the reactor of a bench-scale test unit, pretreated, and tested with Feed A, as described hereinabove in Example I. The results of this test, Test No. 8, are presented hereinbelow in Table IX.

TABLE IX

| | DATA FOR TEST NO. 8, CATALYST H | | | | | | | | | | | | |
|---|---|---|---|---|---|---|---|---|---|---|---|---|---|
| Period No. | 1 | 2 | 3 | 4 | 5 | 6 | 7 | 8 | 9 | 10 | 11 | 12 | 13 |
| Hours on Stream | 19 | 43 | 67 | 91 | 115 | 139 | 163 | 187 | 211 | 235 | 259 | 283 | 307 |
| Temperature | | | | | | | | | | | | | |
| °F. | 779 | — | — | 780 | 780 | 780 | 780 | 779 | — | — | 780 | 779 | 779 |
| °C. | 415 | — | — | 416 | 416 | 416 | 416 | 415 | — | — | 416 | 415 | 415 |
| Pressure, psig | 1,800 | 1,800 | 1,800 | 1,800 | 1,800 | 1,800 | 1,800 | 1,800 | 1,800 | 1,800 | 1,800 | 1,800 | 1,800 |
| kPa | 12,402 | 12,402 | 12,402 | 12,402 | 12,402 | 12,402 | 12,402 | 12,402 | 12,402 | 12,402 | 12,402 | 12,402 | 12,402 |
| LHSV, hr$^{-1}$ | 0.5 | 0.5 | 0.5 | 0.5 | 0.5 | 0.5 | 0.5 | 0.5 | 0.5 | 0.5 | 0.5 | 0.5 | 0.5 |
| Gravity, °API | 38.1 | 36.4 | 36.6 | 36.8 | 36.4 | 36.3 | 36.1 | 36.1 | 35.7 | 35.8 | 36.1 | 36.1 | 35.8 |
| Carbon, wt % | — | — | — | — | — | — | — | — | — | — | — | — | — |
| Hydrogen, wt % | — | — | — | — | — | — | — | — | — | — | — | — | — |
| Nitrogen, ppm | 512 | 371 | 504 | 421 | 385 | 435 | 719 | 637 | 637 | 697 | 619 | 773 | 946 |
| Sulfur, ppm | 970 | 490 | 319 | 320 | 206 | 170 | 191 | 224 | 126 | 115 | 64 | 193 | 109 |
| Pour Point, | | | | | | | | | | | | | |
| °F. | — | — | — | — | — | — | — | — | — | — | — | 69 | — |
| °C. | — | — | — | — | — | — | — | — | — | — | — | 21 | — |
| Viscosity, cst | — | — | — | — | — | — | — | — | — | — | — | 4.01 | — |

TABLE IX-continued

DATA FOR TEST NO. 8, CATALYST H

| Period No. | 1 | 2 | 3 | 4 | 5 | 6 | 7 | 8 | 9 | 10 | 11 | 12 | 13 |
|---|---|---|---|---|---|---|---|---|---|---|---|---|---|
| (40° C.) IBP, | | | | | | | | | | | | | |
| °F. | — | — | — | — | — | — | — | — | — | — | — | — | — |
| °C. | — | — | — | — | — | — | — | — | — | — | — | — | — |
| IBP - 360° F. (182° C.), wt % | — | — | — | — | — | — | — | — | — | — | — | — | — |
| 360° F. (182° C.)–650° F. (343° C.), wt % | — | — | — | — | — | — | — | — | — | — | — | — | — |
| 650° F.+ (343° C.+), wt % | — | — | — | — | — | — | — | — | — | — | — | — | — |
| FBP, | | | | | | | | | | | | | |
| °F. | — | — | — | — | — | — | — | — | — | — | — | — | — |
| °C. | — | — | — | — | — | — | — | — | — | — | — | — | — |
| Gas rate, SCFB × 10³ | — | — | — | — | — | — | — | — | — | — | — | — | — |
| Hydrogen consumption SCFB | — | — | — | — | — | — | — | — | — | — | — | — | — |
| Wt % recovered | — | — | — | — | — | — | — | — | — | — | — | — | — |
| Wt % C₁-C₄ on Feed | — | — | — | — | — | — | — | — | — | — | — | — | — |

A comparison of the denitrogenation abilities of the various catalysts is presented in the accompanying FIGURE. In this FIGURE, the amount of nitrogen in the product is plotted versus the amount of silica in the catalyst support. The amount of nitrogen in the product for each test was obtained as an arithmetic average of the values of the nitrogen level for the first seven days of that test. If an obvious upset or irregularity was associated with a particular value, that value was not included in the average. The FIGURE demonstrates that a catalyst having a hydrogenation component, as defined hereinabove, and a support containing from about 10 wt% silica to about 50 wt% silica, and preferably from about 15 wt% silica to about 50 wt% silica, will provide improved denitrogenation of a whole shale oil. In fact, such improved performance is unexpected, since catalysts having supports containing silica in an amount outside of the range are shown to perform in a less effective manner.

EXAMPLE IX

The properties and compositions of the various catalysts employed in the examples hereinbefore are listed in Table X hereinbelow.

TABLE X

CATALYST PHYSICAL PROPERTIES

| Catalyst | Support, wt % Al₂O₃ | Support, wt % SiO₂ | Surface Area, m²/gm | Total Pore Volume, cc/gm | A.P.D. nm | A.P.D. Å |
|---|---|---|---|---|---|---|
| A | 0 | 100 | 268 | 0.9115 | 13.6 | 136 |
| B | 100 | 0 | 189 | 0.5321 | 11.3 | 113 |
| C | 100 | 0 | 173 | 0.5307 | 12.3 | 123 |
| D | 80 | 20 | 227 | 0.6622 | 11.7 | 117 |
| E | 70 | 30 | 227 | 0.7837 | 13.8 | 138 |
| F | 50 | 50 | 170 | 0.4746 | 11.2 | 112 |
| G | 90 | 10 | 194 | 0.3950 | 8.2 | 82 |
| H | 30 | 70 | 199 | 0.3681 | 7.4 | 74 |

| Catalyst | 0–50Å | 50–100Å | 100–150Å | 150–1,200Å |
|---|---|---|---|---|
| A | 2.4 | 27.9 | 62.1 | 7.6 |
| B | 8.0 | 61.0 | 28.5 | 2.5 |
| C | 5.2 | 63.1 | 30.7 | 1.0 |
| D | 15.4 | 47.8 | 10.1 | 26.7 |
| E | 10.4 | 40.8 | 8.8 | 40.0 |
| F | 9.6 | 57.5 | 20.0 | 12.9 |
| G | 24.5 | 67.0 | 5.2 | 3.3 |
| H | 39.7 | 49.8 | 2.2 | 8.3 |

(% of Total Pore Volume in Pores having Pore Diameters of)

The data in Table X support the ranges of values for the physical properties that are proposed hereinabove for the catalyst of the present invention.

Additional pore size information for the catalysts considered in the previous examples are presented in Table XI hereinbelow.

TABLE XI

ADDITIONAL CATALYST PROPERTIES

| CATALYST | P.V. in 60–150Å Pores / P.V. in 0–150Å Pores | P.V. in 150–300Å Pores / P.V. in 0–300Å Pores | P.V. with 150–1,200 Å Diam, cc/gm | P.V. with 0–600 Å Diam, cc/gm |
|---|---|---|---|---|
| A | 94.5 | 7.2 | 0.0696 | 0.9100 |
| B | 82.5 | 1.4 | 0.0134 | 0.5288 |
| C | 90.4 | 0.8 | 0.0057 | 0.5296 |
| D | 62.8 | 9.5 | 0.1702 | 0.6055 |
| E | 67.4 | 9.7 | 0.3071 | 0.6655 |
| F | 72.5 | 4.8 | 0.0557 | 0.4590 |
| G | 58.1 | 2.1 | 0.0113 | 0.3918 |
| H | 32.5 | 2.3 | 0.0307 | 0.3539 |

One of the references discussed hereinabove, in the Background of the Invention, U.S. Pat. No. 4,008,149, discloses a catalyst having an alumina-silica support, which catalyst is characterized in that the volume of pores having a diameter of 60 to 150 Å is at least about 80% of the volume of pores having a diameter of 0 to 150 Å.

It is to be noted that examples of the catalyst of the present invention, i.e., Catalysts D, E, and F, provide a pore volume in pores having diameters of 60 to 150 Å that is less than 80% of the pore volume in pores having diameters of 0 to 150 Å. Hence, the catalyst of the present invention can be distinguished from that disclosed in U.S. Pat. No. 4,008,149.

What is claimed is:

1. A catalyst which comprises a hydrogenation component comprising chromium, molybdenum, and at least one metal from Group VIII of the Periodic Table of Elements deposed upon a porous alumina-silica support, the silica of said support being present in an amount within the range of about 10 wt% of about 50 wt%, based upon the weight of said support, said chromium, molybdenum, and metal from Group VIII being present in the elemental form, as oxides, as sulfides, or mixtures thereof, said catalyst having a surface area within the range of about 150 m$^2$/gm to about 350 m$^2$/gm, a pore volume within the range of about 0.4 cc/gm to about 1.0 cc/gm, and average pore diameter within the range of about 60 A (60 nm) to about 150 A (15 nm), the volume of pores having a diameter of 60 A (6 nm) to 150 A (15 nm) is less than 80% of the volume of pores having a diameter of 0 A (0 nm) to 150 A (15 nm), the volume of pores having a diameter of 150 A (15 nm) to 1,2000 A (120 nm) is greater than 0.01 cc/gm.

2. A catalyst which comprises a hydrogenation component comprising chromium, molybdenum, and at least one metal from Group VIII of the Periodic Table of Elements deposed upon a porous alumina-silica-support, the silica of said support being present in an amount within the range of about 15 wt% to about 50 wt%, based upon the weight of said support, said chromium, molybdenum and one metal from Group VIII being present in the elemental form, as oxides, as sulfides, or mixtures thereof, said catalyst having a surface area within the range of 150 m$^2$/gm to about 250 m$^2$/gm, a pore volume within the range of about 0.4 cc/gm to about 0.8 cc/gm, an average pore diameter within the range of about 110 A (11 nm) to about 150 A (15 nm), and the volume of pores having a diameter of 60 A (6 nm) to 150 A (15 nm) is less than 80% of the volume of pores having a diameter of 0 A (0 nm) to 150 A (15 nm), the volume of pores having a diameter of 150 A (15 nm) to 1,200 A (120 nm) is greater than 0.01 cc/gm.

3. The catalyst of claim 1, wherein chromium is present in an amount within the range of about 3 wt% to about 15 wt%, calculated as Cr$_2$O$_3$ and based upon the weight of said catalyst, molybdenum is present in an amount within the range of about 5 wt% to about 25 wt%, calculated as MoO$_3$ and based upon the weight of said catalyst, and said metal from Group VIII is present in an amount within the range of about 0.5 wt% to about 10 wt%, calculated as the oxide and based upon the weight of said catalyst.

4. The catalyst of claim 2, wherein chromium is present in an amount within the range of about 3 wt% to about 15%, calculated as Cr$_2$O$_3$ and based upon the weight of said catalyst, molybdenum is present in an amount within the range of about 5 wt% to about 25 wt%, calculated as MoO$_3$ and based upon the weight of said catalyst, and said metal from Group VIII is present in an amount within the range of about 0.5 wt% to about 10 wt%, calculated as the oxide and based upon the weight of said catalyst.

5. The catalyst of claim 3, wherein said metal of Group VIII is a non-noble metal.

6. The catalyst of claim 4, wherein said metal of Group VIII is a non-noble metal.

7. The catalyst of claim 5, wherein said metal of Group VIII is cobalt or nickel.

8. The catalyst of claim 6, wherein said metal of Group VIII is cobalt or nickel.

9. The catalyst of claim 7, wherein said metal of Group VIII is cobalt.

10. The catalyst of claim 8, wherein said metal of Group VIII is cobalt.

* * * * *